United States Patent [19]

Hosaka et al.

[11] 4,117,096

[45] Sep. 26, 1978

[54] PROCESS FOR PRODUCING POWDER OF β-TYPE SILICON CARBIDE

[75] Inventors: Takuo Hosaka, Toyota; Tadao Sasaki, Shijiyonawate; Hiroshige Suzuki, Tokyo, all of Japan

[73] Assignee: Nippon Crucible Co., Ltd., Tokyo, Japan

[21] Appl. No.: 825,733

[22] Filed: Aug. 18, 1977

[30] Foreign Application Priority Data

Aug. 20, 1976 [JP] Japan .................................. 51-99281

[51] Int. Cl.$^2$ ............................................. C01B 31/36
[52] U.S. Cl. ...................................... 423/345; 106/44
[58] Field of Search ........................... 423/345; 106/44

[56] References Cited

PUBLICATIONS

Yutaka "Osaka Funtsu Kogyo Shoreikan Hokoku", No. 19, (1958), pp. 75–78.
Hase, et al., "J. of Nuclear Materials" 59, No. 1, (1976), pp. 42–48.

Primary Examiner—Jack Cooper
Attorney, Agent, or Firm—Sughrue, Rothwell, Mion, Zinn and Macpeak

[57] ABSTRACT

A process for producing a powder of β-type silicon carbide, which comprises heating at a temperature of about 800° to about 1,400° C a mixture of a carbon powder having a particle size of about 20 microns or less and a metallic silicon powder with a carbon-to-silicon molar ratio of 1 : 0.6 to 1 : 2 in an oxidizing atmosphere having an oxygen concentration of 0.3 to 35% by volume, thereby to induce a spontaneous continuous reaction between carbon and silicon.

5 Claims, No Drawings

4,117,096

PROCESS FOR PRODUCING POWDER OF β-TYPE SILICON CARBIDE

BACKGROUND OF THE INVENTION

1. Field of the Invention

This invention relates to a process for producing a powder of β-type silicon carbide.

2. Description of the Prior Art

β-Type silicon carbide, because of its transition temperature, is called a low-temperature type silicon carbide, and is available in a finer particle size and more active form than α-type silicon carbide. It is therefore, useful as a lapping powder, a material for pigments, matrix-forming materials for refractories, and a sintering material for silicon carbide sintered bodies.

According to conventional processes, for example those disclosed in British Pat. No. 1,199,953, and Japanese patent application (OPI) Nos. 75600/75 (corresponding to U.S. patent application Ser. No. 414,128, filed Nov. 8, 1973) and 37898/76, the method for preparing the starting materials is complicated, and a heating atmosphere free from oxygen is required in order to achieve high purities and high yields. Furthermore, high temperatures exceeding 1,400° C and heating for long periods of time, e.g., at least about 2 hours, are required. Hence, a special apparatus, such as a high temperature variable atmosphere furnace, which is inefficient, non-productive and uneconomical, must be used when such processes are employed. Further, this apparatus is greatly limited in procedure and manufacturing techniques. Accordingly, a powder of β-type silicon carbide is not readily available, and the industrial utilization of β-type silicon carbide is naturally limited.

SUMMARY OF THE INVENTION

An object of this invention is to provide a process for synthesizing a powder of β-type silicon carbide in an oxidizing atmosphere such as air.

According to the present invention, there is provided a process for producing a powder of β-type silicon carbide, which comprises heating at a temperature of about 800° to about 1,400° C a mixture of a carbon powder having a particle size of not more than about 20 microns and a metallic silicon powder with a carbon-to-silicon molar ratio of 1 : 0.6 to 1 : 2 in an oxidizing atmosphere having an oxygen concentration of 0.3 to 35% by volume, thereby to induce a spontaneous continuous reaction between carbon and silicon and to complete the synthesis substantially instantaneously.

DETAILED DESCRIPTION OF THE INVENTION

An essential feature of this invention is that a mixture of carbon powder and metallic silicon powder is heated in an oxidizing atmosphere. Although no detailed reaction mechanism has yet been elucidated, it is presumed that oxygen reacts with a certain ingredient in the mixture to form an intermediate product which catalyzes the reaction to initiate the formation of silicon carbide. This intermediate product then becomes a trigger to initiate the reaction within a surprisingly low temperature range of about 800° to about 1,400° C, and the synthesis of β-type silicon carbide is completed instantaneously (in actual operation, within about 1 to 2 minutes).

The reaction which is initiated within a low temperature range of about 800° to about 1,400° C proceeds rapidly and is completed within a short period of time is described in this application as "a spontaneous continuous reaction."

Since the starting materials and the reaction product are not kept at high temperatures for long periods of time as they are in the conventional processes, any deterioration of the quality of the product can be substantially avoided even if the atmosphere is oxidizing. Thus, the process of this invention substantially removes the restrictions of the prior art processes, and provides a way to mass produce a powder of β-type silicon carbide having a high purity.

The details of the process of this invention are described below.

Experiments have shown that a spontaneous continuous reaction does not occur if the particle size of the carbon starting material exceeds about 20 microns. In such a case, a greater part of the starting mixture or a portion of the carbon particles remains unreacted. Therefore, the particle size of the carbon powder must be controlled to not more than about 20 microns. In actual practice, the particle size of the carbon material is appropriately selected within this range depending on the use, purpose, etc. of the powdery product. For example, to obtain active and fine particle size silicon carbide, a carbon starting material having as fine a particle size as possible should be chosen. A preferred particle size range is about 0.005 to about 5 microns.

The particle size of the silicon starting material is described below. When the spontaneous continuous reaction begins, the temperature of the starting mixture rapidly increases due to the heat of reaction, and a portion of the silicon fuses or vaporizes and combines with the carbon. Hence, the particle size of the silicon starting material may be fairly large. The maximum particle size permissible for the silicon starting material is about 200 microns. A preferred particle size for the silicon starting material is one passing through a 100 micron sieve.

Materials for the starting mixture may be carbonaceous materials such as natural graphite, artificial graphite and coke, all of which have an ash content of about 30% by weight or less, raw coke, and carbon blacks, which are generally readily available, as the carbon starting material. Silicon powders within a wide range of materials having a silicon content of about 90% or more which can be selected from silicons for semiconductors to commercially available industrial-grade silicon powders, if they have the specified particle size. Since the purities of these starting materials affect the purity and particle size of the final product, they should be appropriately chosen by considering the properties of the desired silicon carbide product. In other words, according to this invention, a wide range of products from a low to a high purity can be easily obtained by selecting the purities of the starting materials used. In actual practice, it is desirable to choose the starting materials depending on the use, purpose, etc. of the final product.

The ratio between carbon and silicon will be described. In the spontaneous continuous reaction, not only silicon, but also a part of carbon reacts individually or in combination, and dissipates from the system as a gas such as CO or SiO. The extent of dissipation is affected by the particle sizes of the starting materials, the degree of mixing, the size of the mixture batch, the heating temperature, the oxygen concentration of the atmosphere, etc. Accordingly, in the present invention, the mixing ratio between the carbon powder and the metallic silicon powder is difficult to set such forth unequivocally. The molar ratio specified above of 1 : 0.6 to 1 : 2 for the carbon-to-silicon was determined experimentally. If the molar ratio of metallic silicon to carbon is less than 0.6 : 1, a large quantity of unreacted carbon remains. If the molar ratio of metallic silicon to carbon exceeds 2 : 1, the metallic silicon alone is sintered first, and reaction of the silicon with carbon does not take place, or even if the reaction occurs, a large quantity of sintered metallic silicon remains which will be detrimental to the subsequent pulverization of the product.

Suitable starting materials in accordance with this invention are well mixed, e.g., using conventional methods, and then filled in a suitable refractory container, or formed into a compressed powder e.g., using conventional methods, then the starting mixture is heated in an oxidizing atmosphere. Irrespective of whether or not the starting mixture is packed in a high density, the spontaneous continuous reaction is always induced as the temperature of the starting mixture is increased. Since, however, the resulting powder of $\beta$-type silicon carbide tends to have a larger particle size with higher filling density, the filling density should be appropriately considered in actual practice depending on the use, purpose, etc. of the final product.

If the oxygen concentration of the heating atmosphere is less than 0.3% by volume, a spontaneous continuous reaction is not induced, and an instantaneous synthesis in a low temperature range of about 800° to about 1400° C is no longer possible. Of course, the intended reaction would proceed if the temperature employed is higher than about 1500° C, and the reaction time is increased. But use of temperatures above about 1500° C and long reaction times results in the same disadvantages of the conventional processes, and is not within the intent of the invention. On the other hand, when the oxygen concentration exceeds 35% by volume, adverse effects due to oxidation increase undesirably. Accordingly, a suitable oxygen concentration is 0.3 to 35% by volume. If the oxygen concentration is within the specified range, the heating atmosphere may be any of air, a system also containing a reducing gas or an inert gas, such as CO, $CO_2$, or Ar, and air under a low degree of vacuum (less than about 11 mmHg). This means that in actual performance, conventional open electric furnaces, gas furnaces and pressure reduction furnace and general industrial furnaces intended for the firing of various refractories can be employed.

In the process of this invention, the heat-treatment should be continued until a minimum required temperature for inducing the spontaneous continuous reaction of the starting material mixture is attained. The temperature varies depending on the particle size of the starting materials, the mixing ratio of the starting materials, the degree of mixing of the starting materials, the size of the mixture batch, the oxygen concentration of the heating atmosphere, the speed of heating, etc. Generally, the temperature of the heat treatment is about 800° to 1400° C. Since the temperature which will induce the spontaneous continuous reaction can be easily determined by preliminary experiments, it is preferred to set the maximum heating temperature at a point slightly higher than that temperature. The time required for heating including the time to achieve that temperature is about 0.2 to 5 hours. Longer periods of time are required as the oxygen concentration of the atmosphere decreases. A powder of the product obtained after heat treatment in this invention can be readily produced without any particular mechanical pulverization. The product is obtained mostly as a powder having a particle size of about 500 microns or less. But if the product is pulverized using a conventional pulverizer such as a ball mill or a vibratory mill, the product can be easily crushed to a fine powder generally having a particle size of 60 microns or less, and mostly 1 to 0.01 micron, although the product tends to have a larger particle size with larger particle size of the carbon material. Purities and yields of at least 95% can be easily achieved with silicon carbide in the resulting product. The crystal structure of the silicon carbide is $\beta$-type.

The following Examples are given to further illustrate the present invention. Unless otherwise indicated, all parts, percents, ratios and the like are by weight.

EXAMPLE 1

Commercially available carbon black (2.4 kg; an average particle size of 0.05 to 0.1 micron) and 5.9 kg of commercially available metallic silicon powder having an average particle size of 77 microns and a purity of 95.0% were mixed using a V-mixer. After adding 30% by weight of water, these components were kneaded using a kneader. The mixture was filled, by stamping, into a refractory cylindrical container as a sagger having an inside diameter of 260 mm and a height of 300 mm, and a lid was placed lightly over the container. The container was placed in an electric furnace having silicon carbide heating elements, and heated in an air atmosphere ($O_2$: 20% by volume; $N_2$: 80% by volume) at a rate of about 300° C/hour. When the heating temperature reached about 960° C, a marked fuming which showed the initiation of a spontaneous continuous reaction was observed. This phenomenon ended within 1 to 2 minutes. Heating was continued, and at 980° C, the electric current was cut off. The contents of the furnace were allowed to cool, and about 20 hours later, the heated product was withdrawn. The outside surface of the product was somewhat whitened to a thickness of about 2 mm as a result of oxidation. The inside of the product was uniformly yellowish green, thus clearly showing that the product was highly pure silicon carbide. Apparently, this product was not sintered at all, and could be easily disintegrated to a powder having an apparent particle size of less than about 200 microns. When the product was pulverized in the wet state for 30 minutes in a vibratory mill, a fine powder having a particle size of about 0.05 to 5 microns was obtained. Using X-ray analysis, most of the product was identified as $\beta$-type crystals of silicon carbide. Wet chemical analysis showed that the purity of the product was 96.6%, except for surface layer. The amount of the product obtained after heating was 8.0 kg which was about 100% of the theoretical yield.

EXAMPLE 2

Using the procedure of Example 1, the container with the stamped mixture therein was buried in coke breeze, and fired in a tunnel furnace for refractory firing at a heating zone temperature of about 1,100° C. The time from charging to withdrawal from the furnace was about 40 hours. The heating atmosphere in the furnace was 3.2% by volume of $O_2$, 10.8% of $CO_2$, 13.9% of $H_2O$, 77.0% of $N_2$ and 0% of CO. The oxide layer on the surface of the heated product was very thin, and the product as a whole had a brilliant greenish yellow color. The yield of the product and the characteristics of the product were the same as those in Example 1, and the purity of the silicon carbide was increased to 97.8%.

EXAMPLE 3

Using the procedure of Example 1, the temperature of the inside of the electric furnace was maintained at 1,300° C, and the stamped mixture, sufficiently dried, was fed into the furnace and rapidly heated. About 1 hour later, a marked fuming was observed. The product was immediately removed from the furnace, and quenched by being buried in coke breeze. The resulting heated product was substantially free from a surface oxide layer, and as a whole was a brilliant greenish yellow. The yield and other properties of the product were quite the same as those in Examples 1 and 2. The purity of the silicon carbide was further increased to 99.3%.

EXAMPLE 4

When in the procedure of Example 1, a synthetic graphite powder having an average particle size of 2 microns was used as the carbon material, the fuming initiation temperature was about 1,170° C. Thus, at 1,200° C the electric current to the furnace was cut off, and the product was allowed to cool. The appearance, yield and other properties of the heated product were much the same as those in Example 1. The particle size of the crystals was somewhat larger. When the product was pulverized in the wet state for 30 minutes in a vibratory mill, the powder had a particle size of about 0.5 to about 50 microns.

While the invention has been described in detail and with reference to specific embodiments thereof, it will be apparent to one skilled in the art that various changes and modifications can be made therein without departing from the spirit and scope thereof.

What is claimed is:

1. A process for producing a powder of $\beta$-type silicon carbide, which comprises heating a mixture of a carbon powder having a particle size of about 20 microns or less, and a metallic silicon powder having a particle size not greater than 200 microns with a carbon-to-silicon molar ration of 1:0.6 to 1:2 to a temperature of 800° to about 1400° C in an oxidizing atmosphere having an oxygen concentration of 0.3 to 35% by volume, to thereby induce a spontaneous continuous reaction between carbon and silicon and effect the formation of $\beta$-type silicon carbide.

2. The process of claim 1, wherein said carbon powder is a carbonaceous material selected from the group consisting of natural graphite, artificial graphite, coke, raw coke, and carbon black.

3. The process of claim 2, wherein said carbon powder has an ash content of about 30% by weight or less.

4. The process of claim 1, wherein the carbon particle size is 0.005 to 5 microns.

5. The process of claim 1, wherein the silicon particle size is such that the silicon powder passes through a 100 micron sieve.

* * * * *